US009848624B2

(12) United States Patent
Ley et al.

(10) Patent No.: US 9,848,624 B2
(45) Date of Patent: Dec. 26, 2017

(54) USE OF RUBUSOSIDE FOR REDUCING OR SUPPRESSING CERTAIN UNPLEASANT TASTE IMPRESSIONS

(71) Applicant: SYMRISE AG, Holzminden (DE)

(72) Inventors: Jakob Peter Ley, Holzminden (DE); Katharina Reichelt, Holzminden (DE); Thomas Riess, Holzminden (DE); Kathrin Langer, Dassel-Hilwartshausen (DE); Susanne Paetz, Höxter (DE)

(73) Assignee: Symrise AG, Holzminden (DE)

( * ) Notice: Subject to any disclaimer, the term of this patent is extended or adjusted under 35 U.S.C. 154(b) by 168 days.

(21) Appl. No.: 14/295,719

(22) Filed: Jun. 4, 2014

(65) Prior Publication Data
US 2014/0287122 A1 Sep. 25, 2014

Related U.S. Application Data

(62) Division of application No. 13/104,511, filed on May 10, 2011, now abandoned.

(60) Provisional application No. 61/333,435, filed on May 11, 2010.

(51) Int. Cl.
A23L 1/236 (2006.01)
A23L 1/22 (2006.01)
A23L 27/00 (2016.01)

(52) U.S. Cl.
CPC ........... *A23L 1/22075* (2013.01); *A23L 27/84* (2016.08); *A23L 27/86* (2016.08)

(58) Field of Classification Search
None
See application file for complete search history.

(56) References Cited

U.S. PATENT DOCUMENTS

| 2002/0188019 | A1* | 12/2002 | Ley ................. A23F 3/405 514/456 |
| 2004/0241312 | A1* | 12/2004 | Gatfield ................ A23G 3/346 426/650 |
| 2007/0116829 | A1* | 5/2007 | Prakash ................ A23L 1/2364 426/548 |
| 2008/0095719 | A1* | 4/2008 | Herrmann ................ A61K 8/97 424/48 |
| 2008/0096969 | A1 | 4/2008 | Ley |
| 2008/0220140 | A1 | 9/2008 | Ley et al. |
| 2008/0227867 | A1 | 9/2008 | Ley et al. |
| 2008/0292763 | A1 | 11/2008 | Looft et al. |
| 2009/0035427 | A1 | 2/2009 | Rubin |
| 2010/0092638 | A1 | 4/2010 | Hansen et al. |
| 2010/0151055 | A1* | 6/2010 | Riess ................. A23L 1/22083 424/679 |
| 2011/0039796 | A1 | 2/2011 | Liu et al. |

FOREIGN PATENT DOCUMENTS

| DE | 10 2009 002 268 A1 | 10/2010 |
| DE | 10 2009 046 126 A1 | 5/2011 |
| EP | 1258200 A2 | 11/2002 |
| EP | 2 253 226 A1 | 11/2010 |
| EP | 2 298 084 A1 | 3/2011 |
| EP | 2340719 A1 | 7/2011 |
| JP | 2008043287 A | 2/2008 |
| WO | WO-0140902 A2 | 6/2001 |
| WO | WO-2004000787 A2 | 12/2003 |
| WO | WO-2004026840 A1 | 4/2004 |
| WO | WO-2004043906 A2 | 5/2004 |
| WO | WO-2004078302 A1 | 9/2004 |
| WO | WO-2005096841 A1 | 10/2005 |
| WO | WO-2006024587 A1 | 3/2006 |
| WO | WO-2006058893 A2 | 6/2006 |
| WO | WO-2006106023 A1 | 10/2006 |
| WO | WO-2007003527 A1 | 1/2007 |
| WO | WO-2007014879 A1 | 2/2007 |
| WO | WO-2007045566 A1 | 4/2007 |
| WO | WO-2007070224 A2 | 6/2007 |
| WO | WO-2007138031 A2 | 12/2007 |
| WO | WO-2008046895 A1 | 4/2008 |
| WO | WO-2008049256 A1 | 5/2008 |
| WO | WO-2009016374 A1 | 2/2009 |

(Continued)

OTHER PUBLICATIONS

Sohi et al. (Drug Development and industrial Pharmacy, 30:5, 429-448, 2004.*
Meyerhof, W., "Elucidation of mammalian bitter taste," Rev Physiol Pharmacol, (2005), 154, 37-72.
Ley, J. P., "Masking Bitter Taste by Molecules," Chem. Percept, (2008) 1, 58-77.
Stark, T., et al., "Application of a Molecular Sensory Science Approach to Alkalized Cocoa (Theobroma cacao): Structure Determination and Sensory Activity of Nonenzymatically C-Glycosylated Flavan-3-ols," J. Agric. Food Chem., 2006, 54, 9510-9521.
Scharbert, S., et al., "Evaluation of the taste contribution of theaflavines in black tea infusions using the taste activity concept.," Eur Food Res Technol, (2004), 218, 442-447.

(Continued)

*Primary Examiner* — Bong-Sook Baek
(74) *Attorney, Agent, or Firm* — Dilworth & Barrese LLP

(57) ABSTRACT

The invention relates to the use of rubusoside and certain mixtures containing rubusoside, preferably the use of certain rubusoside-containing mixtures, in particular *Rubus suavissimus* extracts, for masking, reducing or suppressing a bitter, sour and/or astringent taste impression. The invention further relates to orally consumable preparations, comprising at least one bitter, sour and/or astringent-tasting substance and rubusoside or certain rubusoside-containing mixtures, preferably certain *Rubus suavissimus* extracts, a corresponding method of producing said preparations and a method for reducing or suppressing the bitter, sour and/or astringent effect of a bitter, sour and/or astringent-tasting substance. The invention further relates to certain flavoring compositions that are particularly effective for masking, reducing or suppressing a bitter, sour and/or astringent taste impression.

7 Claims, No Drawings

(56) References Cited

FOREIGN PATENT DOCUMENTS

WO     WO-2009126950 A2     10/2009
WO     WO-2011090709 A1     7/2011

OTHER PUBLICATIONS

Stark, T., "Molecular Definition of the Taste of Roasted Cocoa Nibs (Theobroma cacao) by Means of Quantitative Studies and Sensory Experiment," J. Agric. Food Chem., 2006, 54, (15), 5530-5539.

Chou, G., et al., "Quantitative and Fingerprint Analyses of Chinese Sweet Tea Plant (Rubus suavissimus S. Lee)," Journal of Agricultural and Food Chemistry, vol. 57, No. 3, 2009, pp. 1076-1083.

Lesschaeve, I., et al., "Polyphenols: factors influencing their sensory properties and their effects on food and beverage preferences[1-3]," American Journal of Clinical Nutrition, 2005, 81, 330S-335S.

Hirono, S., et al., "Sweet and Bitter Diterpene-Glucosides from Leaves of Rubus suavissimus," Chemical & Pharmaceutical Bulletin, 1990, 38, (6), 1743-1744.

European Search Report, EP Application No. 11165566.8, dated Aug. 19, 2011.

\* cited by examiner

USE OF RUBUSOSIDE FOR REDUCING OR SUPPRESSING CERTAIN UNPLEASANT TASTE IMPRESSIONS

CROSS-REFERENCE TO RELATED APPLICATIONS

This application is a divisional of U.S. application Ser. No. 13/104,511, filed May 10, 2011, which claims benefit of U.S. Provisional Application No. 61/333,435, filed May 11, 2010, which is incorporated herein by reference in its entireties.

The invention relates to the use of rubusoside and certain mixtures containing rubusoside, preferably the use of certain rubusoside-containing mixtures, in particular *Rubus suavissimus* extracts, for masking, reducing or suppressing a bitter, sour and/or astringent taste impression. The invention further relates to orally consumable preparations, comprising at least one bitter, sour and/or astringent-tasting substance and rubusoside or certain rubusoside-containing mixtures, preferably certain *Rubus suavissimus* extracts, a corresponding method of producing said preparations and a method for reducing or suppressing the bitter, sour and/or astringent effect of a bitter, sour and/or astringent-tasting substance. The invention further relates to certain flavoring compositions that are particularly effective for masking, reducing or suppressing a bitter, sour and/or astringent taste impression.

Foodstuffs or semi-luxuries often contain various unpleasant-tasting substances, e.g. bitter substances, strongly sour substances and astringent substances, which on the one hand in moderation are desirable and characteristic (e.g. caffeine in tea or coffee, tannins in red wine or green tea, quinine in so-called bitter-lemon beverages, saponins or isoflavonoids or glycosides thereof in soya milk, hop extracts in beer, fruit acids or edible acids in sweet fruit juices), but on the other hand can also greatly reduce the value (e.g. flavonoid glycosides and limonoids in *citrus* juices, bitter and/or astringent aftertaste of many artificial sweeteners such as aspartame or saccharin, hydrophobic amino acids and/or peptides in cheese, fruit acids or edible acids without sufficient toning down by sweet flavoring materials, e.g. in milk products containing lactic acid). Often the unpleasant taste is further intensified by unpleasant odors, for example in soya milk, which often has a bitter and astringent taste, a note generally designated as "beany" is also described as unpleasant.

Bitter taste is regularly caused by particular substances (for examples see below), which bind to special bitter receptors on taste cells (which are to be found in the so-called taste buds on the tongue) and, via neurochemical cascades, send a signal to the brain, which causes a defense reaction and a negative taste impression (cf. Wolfgang Meyerhof, Reviews of Physiology, Biochemistry and Pharmacology 2005, 154, 37-72).

Astringent taste is as a rule caused by precipitation of proline-rich proteins in the saliva by astringents, e.g. metal salts or tannins. The normally homogeneous saliva that serves as a "lubricant" then contains denatured proteins, which reduce the lubricity and so leave a rough or dry sensation in the mouth, which is also experienced as astringent (Isabelle Lesschaeve, Ann C. Noble, American Journal of Clinical Nutrition 2005, 81, 330S-335S).

Sour taste is caused by protic acids. The so-called titratable proton concentration is then more decisive than the pH for the sour impression: for example, a hydrochloric acid solution with the same pH as a malic acid solution tastes far less sour in comparison. Classically, the aversive sour taste is toned down considerably by combining with sweet flavoring materials, principally sugar, or even by substances that taste salty, mainly sodium chloride, whereas the sour taste is perceived as much more unpleasant with bitter or astringent tasting substances. However, sweet-tasting substances (for example sweeteners) are regularly used at comparatively high concentrations, thus as a rule in an amount which, with respect to their sweet taste impression, would correspond to an at least 2 wt. % aqueous sucrose solution, to achieve a marked toning-down of the sour impression.

Some fruit acids, in particular citric acid, succinic acid, malic acid and tartaric acid, also produce a sensory impression described as astringent, along with the sour taste.

In some foodstuffs, in particular foodstuffs derived from sweet-sour fruits or vegetables (e.g. fruit juices, fruit preparations and foodstuffs produced from them) and products produced by fermentation by acid-producing microorganisms (e.g. yogurt, ghee, kefir, soya-yogurt, sauerkraut, sourdough bread, sausages, sour milk, cheese, mixed pickles, refreshing drinks containing lactobionic acid or glucuronic acid), the acid content is necessary to produce microbial stability. Up to a certain degree this is accepted as regards taste, but in many cases there is a desire to achieve a reduced sour sensory impression without affecting the pH, which is required for the keeping qualities. We must also consider foodstuffs for which, in order to achieve a sufficient microbial or also antioxidative stability, the pH is adjusted with fruit acids or edible acids (e.g. apple juice with ascorbic acid, refreshing drinks with citric or phosphoric acid, dressings and ketchup with acetic acid), but the sour taste is regularly perceived as too strong and should therefore be reduced in sensory terms.

To summarize, it can be stated that there are various foods or foodstuffs that produce a sour sensory impression that is too high, i.e. higher than desired, which is caused by the natural concentration of fruit acids, acids formed by fermentation or acids added for reasons of stability, and where the pH of the foods or foodstuffs cannot or should not be altered for technological reasons (microbial stability, antioxidative stability etc., as explained above).

It has been described in the prior art that certain proteins such as miraculin can, in the presence of acids, transform the sour impression more or less into a sweet taste impression (http://de.wikipedia.org/wiki/Miraculin). However, because of conversion to the sweet taste, which is undesirable in non-sweet applications, this solution is only of limited use and moreover lasts too long, at 2-4 h, so that this effect is only of very restricted benefit.

Meanwhile, some approaches for reduction of bitterness have been described (e.g. Ley, J. P. (2008). "Masking Bitter Taste by Molecules." Chemosensory Perception 1(1): 58-77). However, the approaches described all have one or more disadvantages, such as non-naturalness, expensive raw materials, side effects (e.g. suppression of sweetness, simultaneously salty taste etc.), solubility problems, so that there is still a demand for natural bitter-masking solutions that are easy to use. Flavoring solutions that reduce the sour impression and largely have a neutral taste, and do not alter the pH of the consumable application, have not been described previously.

The object of the present invention was therefore to provide substances that are able to mask, reduce or suppress the bitter, sour and/or astringent taste impression of compounds, also in preparations, in particular in foodstuffs and semi-luxuries and medicinal products, preferably without substantially affecting the otherwise desirable taste impression of these preparations.

This object is achieved according to the invention in a first aspect by the use of rubusoside, preferably the use of certain mixtures or plant extracts containing rubusoside, for masking, reducing or suppressing a bitter, sour and/or astringent taste impression of a substance that tastes bitter, sour and/or astringent.

It was found, surprisingly, that rubusoside, in particular in the form of the mixtures to be used according to the invention and flavoring compositions according to the invention or to be used according to the invention, described hereunder, can mask, reduce or even completely suppress a bitter, sour and/or astringent impression of a large number of unpleasant-tasting orally consumable preparations, which contain one or more bitter, sour and/or astringent-tasting substances.

It is known that extracts from *Rubus suavissimus* or certain compounds isolated therefrom are able to make sweet-tasting orally consumable preparations taste even sweeter, as described in WO 2008/049256. Moreover, it is known that isolated rubusoside from *Rubus suavissimus* tastes perceptibly sweet starting from a concentration of approx. 25 mg/kg (equivalent to 25 ppm) (taste recognition threshold). Rubusoside can be used as a sweetener (Hirono, S.; Chou, W. H.; Kasai, R.; Tanaka, O.; Tada, T., Sweet and bitter diterpene glucosides from leaves of *Rubus suavissimus*. Chemical & Pharmaceutical Bulletin 1990, 38, (6), 1743-1744). In our own tests it was found that rubusoside, at a concentration of 100 mg/kg (equivalent to 100 ppm) in water, has a sweet taste that is equivalent to the sweetness of a 1.4% aqueous sucrose solution.

It was also found in our own tests that above a concentration of 100 mg/kg in water, rubusoside additionally displays a recognizably bitter taste.

JP 2008043287 describes how the unpleasant-tasting substances that may be present in a conventionally produced *Rubus suavissimus* extract can be decreased. Basically, a person skilled in the art also knows that the use of sweeteners in definitely sweet-tasting concentrations can be used for suppressing unpleasant taste impressions.

However, it is surprising that rubusoside, preferably in the form of a mixture to be used according to the invention, in particular in the form of certain *Rubus suavissimus* extracts, can reduce the unpleasant taste impressions of bitter, sour and/or astringent, in particular a sour and optionally additionally astringent taste impression, even at concentrations that are not yet perceived as definitely sweet.

It is particularly surprising that certain mixtures containing rubusoside, in particular in the form of certain *Rubus suavissimus* extracts, have a clearly better effect with respect to the sour and astringent taste impression than rubusoside alone, as presented in Example 6 for the example of a yogurt.

In a preferred embodiment the present invention relates to the use of a mixture comprising
(a) rubusoside, and
(b) one or more phenolic compounds, preferably one or more polyphenols, preferably one or more polyphenols, such as occur in a *Rubus* species, preferably in *Rubus suavissimus*.

In a further preferred embodiment, the present invention relates to the use of an extract of a *Rubus* species, preferably an extract from the leaves and optionally from the stems of a *Rubus* species, preferably from the leaves and optionally from the stems of *Rubus suavissimus*.

Polyphenols in the narrower sense of the present text are compounds that contain two or more hydroxyl groups bound directly to an aromatic ring.

The mixtures to be used according to the invention contain apart from (a) rubusoside preferably one, two, three or more phenolic compounds, preferably one, two, three or more polyphenols, with one, two, three or more polyphenols of constituent (b) preferably being selected from the group consisting of ellagic acid, gallic acid and flavonoids, preferably quercetin glycosides, and in particular rutin and isoquercitrin.

Preferred mixtures to be used according to the invention contain the following constituents:
(a) rubusoside in an amount in the range from 0.1 to 50 wt. %, preferably in the range from 0.5 to 30 wt. %, particularly preferably in the range from 1 to 25 wt. %,
(b) one or more phenolic compounds, preferably one or more polyphenols, in a total amount in the range from 0.1 wt. % to 25 wt. %, preferably in the range from 0.5 wt. % to 15 wt. %, more preferably in the range from 1 wt. % to 10 wt. %, particularly preferably in the range from 2 wt. % to 8 wt. %,
and
(c) optionally one or more orally consumable liquid diluents, preferably selected from the group consisting of ethanol, 1,2-propylene glycol, vegetable oil triglycerides, triacetin and/or glycerol, preferably in an amount in the range from 1 to 75 wt. %, preferably in the range from 5 to 50 wt. %, particularly preferably in the range from 10 to 40 wt. %, in each case relative to the total weight of the mixture.

The extracts of a *Rubus* species preferably to be used according to the invention, preferably extracts obtained from the leaves and optionally from the stems of a *Rubus* species, preferably from the leaves and optionally from the stems of *Rubus suavissimus*, are obtainable or are obtained by a method comprising the following steps:
a) extraction of leaves and optionally stems with a suitable extractant, preferably selected from the group consisting of water, sub- or supercritical water, supercritical $CO_2$, water-ethanol mixtures, ethanol, ethyl acetate, n-heptane and n-hexane, at a temperature in the range from 0° C. up to the boiling point of the particular extractant or extractants, at normal pressure, reduced or increased pressure, preferably by Soxhlet, countercurrent, percolation or a simple sieve basket technique, so that a primary extract is obtained,
b) optionally concentrating the primary extract obtained in step a), preferably by distillation or other evaporative or pervaporative techniques,
c) treatment of the primary extract (optionally concentrated in step b)) with one or more adsorbents, preferably selected from the group consisting of silica gel, activated charcoal, kieselguhr, aluminum oxide, basic, acid or neutral ion exchangers, preferably in the batch or column method, so that a purified extract (secondary extract) is obtained,
d) drying of the secondary extract obtained in step c), preferably by an evaporative or pervaporative technique,
e) optionally mixing the dried secondary extract obtained in step d) with a suitable diluent or a mixture of two or more diluents, preferably ethanol, 1,2-propylene glycol, vegetable oil triglyceride(s), triacetin and/or glycerol, so that preferably a solution is obtained.

The leaves and optionally also stems of the *Rubus* species, preferably of *Rubus suavissimus*, dried immediately after harvesting, are preferably used in the above method.

Evaporative or pervaporative techniques can be e.g. distillation, sublimation, steam distillation, lyophilization, pervaporative membrane techniques, and spray drying, for which suitable auxiliary agents and carriers can also be added before this treatment.

The above method of production of the extract is preferably carried out in such a way that the extract comprises:
(a) rubusoside in an amount in the range from 0.1 to 50 wt. %, preferably in the range from 0.5 to 30 wt. %, particularly preferably in the range from 1 to 25 wt. %,
and
(b) one or more phenolic compounds, preferably one or more polyphenols, in a total amount in the range from 0.1 wt. % to 25 wt. %, preferably in the range from 0.5 wt. % to 15 wt. %, more preferably in the range from 1 wt. % to 10 wt. %, particularly preferably in the range from 2 wt. % to 8 wt %,
in each case relative to the total weight of the extract.

The mixtures to be used particularly preferably according to the invention, in particular extracts of Rubus suavissimus, contain in addition to (a) rubusoside preferably one, two, three or all polyphenols from the group consisting of ellagic acid, gallic acid, rutin and isoquercitrin, with the mixture or the extract more preferably containing at least ellagic acid, preferably ellagic acid in an amount greater than or equal to 0.05 wt. %, more preferably in an amount greater than or equal to 0.1 wt. %, particularly preferably in an amount greater than or equal to 0.15 wt. %, relative to the total weight of the mixture or of the extract.

Further preferred mixtures or extracts to be used according to the invention are characterized in that the weight ratio of constituent (a) rubusoside to the total amount of phenolic compounds, preferably to the total amount of polyphenols, of constituent (b) is in the range from 100:1 to 1:10, preferably in the range from 50:1 to 1:5, more preferably in the range from 10:1 to 1:1, particularly preferably in the range from 5:1 to 1:1, in each case relative to the total weight of the mixture or of the extract.

It is also preferable according to the invention to use a mixture, which apart from rubusoside, preferably in the form of a Rubus suavissimus extract to be used according to the invention, additionally comprises:
  one or more additional bitter-masking flavors and/or flavoring materials, preferably selected from the group consisting of
  sodium salts, preferably sodium chloride, sodium lactate, sodium citrate, sodium acetate, sodium gluconoate,
  hydroxyflavanones, preferably eriodictyol, homoeriodictyol,
  hesperetin and sodium salts thereof,
  hydroxybenzoic acid amides, preferably 2,4-dihydroxybenzoic acid vanillyl amide, 2,4-dihydroxybenzoic acid-N-(4-hydroxy-3-methoxybenzyl)amide-monosodium salt,
  hydroxydeoxybenzoins, preferably 2-(4-hydroxy-3-methoxyphenyl)-1-(2,4,6-trihydroxyphenyl)ethanone,
  hydroxyphenylalkanediones, preferably gingerdione-[2] and gingerdione-[3],
  diacetyl trimers,
  gamma-aminobutyric acid,
  divanillins,
  4-hydroxydihydrochalcones, preferably phloretin,
  deoxybenzoins, preferably 2-(4-hydroxyphenyl)-1-(4-hydroxy-3-methoxyphenyl)ethanone, and
  hydroxyflavans, preferably 3',7-dihydroxy-4'-methoxyflavan, and
  preferably one or more salivation-promoting flavors and/or flavoring materials.

In addition, it is advantageous if the amount of rubusoside used for masking, reducing or suppressing the bitter, sour and/or astringent-tasting substance or substances is not sufficient to bring about a sweet taste impression that is greater than the sweet taste impression of a 1.5 wt. % aqueous sucrose solution. Starting from that amount, the intrinsic sweetness of rubusoside becomes too noticeable in some orally consumable preparations and kinds of preparations, which may result in an undesirable change of the taste profile of the preparation and there may sometimes be undesirable sensory, in particular taste-related, side effects.

The described use of rubusoside or of mixtures or extracts containing rubusoside preferably finds application in a pharmaceutical preparation intended for oral administration or a preparation serving for nutrition, oral hygiene or pleasure.

The above or the following information on preferred and particularly preferred uses according to the invention or flavoring compositions according to the invention or to be used according to the invention apply correspondingly to the orally consumable preparations according to the invention, described below.

In another aspect, the present invention relates to an orally consumable preparation, containing
(i-a) rubusoside in an amount in the range from 1-200 mg/kg (equivalent to 1-200 ppm), preferably in the range from 10-150 ppm, more preferably in the range from 30 to 100 ppm, particularly preferably in the range from 50-100 ppm, particularly preferably in the range from 65-100 ppm, in each case relative to the total weight of the orally consumable preparation, preferably in the form of a mixture to be used according to the invention, described above, preferably in the form of an extract of Rubus suavissimus, preferably in one of the embodiments stated as preferable,
(i-b) one or more bitter, sour and/or astringent-tasting substances, in an amount which, in an orally consumable comparative preparation of otherwise identical composition but without constituent (i-a), tastes perceptibly bitter, sour and/or astringent,
and the amount of constituent (i-a) is sufficient to mask, reduce or suppress the bitter, sour and/or astringent taste impression of the bitter, sour and/or astringent-tasting substance or substances, in comparison with the comparative preparation.

In the as yet unpublished DE 10 2009 046 126.4 and the applications based thereon (Symrise GmbH & Co. KG), two concrete orally consumable preparations are disclosed. Said preparations are not a subject matter of the present invention.

In a preferred embodiment, an orally consumable preparation according to the invention is accordingly not a refreshing drink consisting of 8 wt. % sugar (sucrose), 0.15 wt. % citric acid, 0.1 wt. % lemon flavoring, 0.050 wt. % ethanolic-aqueous Mondia whitei root extract, dissolved to 5% in 1,2-propanediol, said solution containing 0.015 wt. % of 2-hydroxy-4-methoxybenzaldehyde, 0.010 wt. % extract from Rubus suavissimus, containing 5 wt. % rubusoside relative to the total weight of the extract and 91.69 wt. % water.

In preferred embodiments, an orally consumable composition according to the invention is not a refreshing drink, which comprises all of the following constituents or in whose production all of the following constituents are used: sucrose, citric acid, lemon flavoring, 2-hydroxy-4-methoxybenzaldehyde, rubusoside or a rubusoside-containing extract from Rubus suavissimus, 1,2-propanediol and water.

In a preferred embodiment, furthermore an orally consumable preparation according to the invention is accordingly not a tomato ketchup consisting of 2 wt. % common salt, 1 wt. % starch, 8.4 wt. % sugar (sucrose), 30 wt. % double tomato concentrate, 18 wt. % glucose syrup 80 Brix, 3 wt. % of 10% brandy vinegar, 0.005 wt. % ethanolic-aqueous Mondia whitei root extract, dissolved to 5% in 1,2-propanediol, said solution containing 0.015 wt. % of 2-hydroxy-4-methoxybenzaldehyde, 0.010 wt. % extract from *Rubus suavissimus*, containing 5 wt. % rubusoside, 0.1 wt. % of 2.5% hesperetin in propylene glycol and 37.485 wt. % water.

In preferred embodiments, an orally consumable composition according to the invention is not a tomato ketchup, which comprises all of the following constituents or in whose production all of the following constituents are used: common salt, starch, sucrose, tomato concentrate, glucose syrup, brandy vinegar, 2-hydroxy-4-methoxybenzaldehyde, rubusoside or a rubusoside-containing extract from *Rubus suavissimus*, hesperetin, 1,2-propanediol, propylene glycol and water.

The orally consumable preparation has, before addition or in the absence of rubusoside, a mixture to be used according to the invention, a *Rubus* extract that is preferably to be used according to the invention or a flavoring composition according to the invention or to be used according to the invention (as described hereunder), a perceptibly bitter, sour and/or astringent taste, preferably a perceptibly sour and optionally additionally astringent taste.

This is regularly the case when at least one bitter, sour and/or astringent-tasting substance is present in the preparation at a concentration that is above the relevant recognition taste threshold for the bitter, sour or astringent taste impression.

Orally consumable preparations according to the invention are particularly preferred that comprise at least one bitter, sour and/or astringent-tasting substance, with the amount of the bitter, sour and/or astringent-tasting substance being sufficient so that, in a comparative preparation that does not comprise a flavoring composition according to the invention or to be used according to the invention, but is otherwise of identical composition, it will be perceived as an unpleasant bitter, sour and/or astringent taste, and the amount of the flavoring composition according to the invention or to be used according to the invention in the preparation is sufficient to alter, mask or reduce the sensory perception of the unpleasant taste impression of the bitter, sour and/or astringent-tasting substance, in comparison with the comparative preparation. This is in particular the case when the bitter, sour and/or astringent-tasting substances in each case individually are at a concentration that is definitely above the recognition taste threshold of the respective substance, preferably are present in an amount that is equivalent to double the recognition taste threshold or an even higher concentration.

A preferred orally consumable preparation according to the invention is one in which constituent (i-b) is present in an amount that is at least twice as high as
  the taste recognition threshold of the bitter, sour or astringent-tasting substance or the lowest taste recognition threshold of the bitter, sour and/or astringent-tasting substance, when this imparts at least two or all of the taste impressions bitter, sour and astringent, if the preparation only contains one bitter, sour and/or astringent-tasting substance, or
  the lowest taste recognition threshold of the bitter, sour and/or astringent-tasting substances, if the preparation contains more than one bitter, sour and/or astringent-tasting substance.

The recognition taste threshold is defined in that more than 50% of tasters, with an increasing series of concentrations of the relevant substance in the preparation, can demonstrate this with an unambiguous taste attribute. The higher the actual concentrations of the bitter, sour and/or astringent-tasting substances in the preparation are in comparison with their threshold values, the stronger their sensory impression. The recognition threshold is determined separately for the various taste impressions, and for one and the same substance, which has more than one unpleasant sensory property, can have various values for these taste characteristics. A list of selected threshold values for bitter or astringent-tasting substances is given in Stark, T.; Hofmann, T., Application of a Molecular Sensory Science Approach to Alkalized Cocoa (*Theobroma cacao*): Structure Determination and Sensory Activity of Nonenzymatically C-Glycosylated Flavan-3-ols, J. Agric. Food Chem. 2006, 54, 9510-9521 or Scharbert, S.; Jezussek, M.; Hofmann, T., Evaluation of the taste contribution of theaflavines in black tea infusions using the taste activity concept. Eur. Food Res. Technol. 2004, 218, 442-447. Threshold values for sour compounds are given e.g. in Stark, T.; Bareuther, S.; Hofmann, T., Molecular Definition of the Taste of Roasted Cocoa Nibs (*Theobroma cacao*) by Means of Quantitative Studies and Sensory Experiment. J. Agric. Food Chem. 2006, 54, (15), 5530-5539.

In a further preferred embodiment, the present invention relates to an orally consumable preparation, wherein constituent (i-b) comprises one or more sour and optionally astringent-tasting substances in an amount which, in an orally consumable comparative preparation of otherwise identical composition but without constituent (a), tastes perceptibly sour and optionally additionally astringent.

In a further preferred embodiment, the present invention relates to an orally consumable preparation, where constituent (i-b) comprises one or more sour and astringent-tasting substances, which are preferably selected from the group consisting of ascorbic acid, benzoic acid, glucuronic acid, adipic acid, glutaric acid, malonic acid, succinic acid, malic acid, acetic acid, citric acid, tartaric acid, phosphoric acid, quercitrin, gallic or ellagic acid esters of carbohydrates, and in particular pentagalloyl glucose, optionally galloylated catechins, optionally galloylated epicatechins, proanthocyanidins, procyanidins, thearubigenin, gamma oryzanol, caffeic acid or esters thereof, and in particular chlorogenic acid and isomers thereof.

In another preferred embodiment, the present invention relates to an orally consumable preparation, additionally containing (ii) one or more additional bitter-masking flavors and/or flavoring materials,
and optionally
(iii) one or more additional aroma substances, wherein preferably at least one aroma substance is an aroma substance that suppresses malodors,
and optionally
(iv) one or more salivation-promoting flavors and/or flavoring materials,
and optionally
(v) one or more auxiliary materials or carriers.

Bitter-masking flavors and/or flavoring materials can in each case be selected from the group consisting of nucleotides, for example adenosine-5'-monophosphate, cytidine-5'-monophosphate, inosine-5'-monophosphate, and pharmaceutically acceptable salts thereof; lactisoles; 2,4-dihydroxybenzoic acid; 3-hydroxybenzoic acid; sodium salts, for example sodium chloride, sodium lactate, sodium citrate, sodium acetate, sodium gluconate; hydroxyflavanones, for example eriodictyol, homoeriodictyol, hesperetin and sodium salts thereof (in particular as described in EP 1 258 200 A2, which with respect to the corresponding compounds disclosed therein forms part of this application by reference); hydroxybenzoic acid amides, for example 2,4-dihydroxybenzoic acid vanillyl amide, 2,4-dihydroxybenzoic acid-N-(4-hydroxy-3-methoxybenzyl)amide, 2,4,6-trihydroxybenzoic acid-N-(4-hydroxy-3-methoxybenzyl) amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxybenzyl)amide-monosodium salt, 2,4-dihydroxybenzoic acid-N-2-(4-hydroxy-3-methoxyphenyl)ethyl amide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl)ethyl]amide; 4-hydroxybenzoic acid vanillyl amide (in particular as described in WO 2006/024587, which with respect to the corresponding compounds disclosed therein forms part of this application by reference); hydroxydeoxybenzoins, for example 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone) (in particular as described in WO 2006/106023, which with respect to the corresponding compounds disclosed therein forms part of this application by reference); hydroxyphenylalkanediones, for example gingerdione-[2], gingerdione-[3], gingerdione-[4], dehydrog ingerdione-[2], dehydrogingerdione-[3], dehydrogingerdione-[4]) (in particular as described in WO 2007/003527, which with respect to the corresponding compounds disclosed therein forms part of this application by reference); diacetyl trimers (in particular as described in WO 2006/058893, which with respect to the corresponding compounds disclosed therein forms part of this application by reference); gamma-aminobutyric acids (in particular as described in WO 2005/096841, which with respect to the corresponding compounds disclosed therein forms part of this application by reference); divanillins (in particular as described in WO 2004/078302, which with respect to the corresponding compounds disclosed therein forms part of this application by reference), 4-hydroxydihydrochalcones, for example phloretin, davidigenin (in particular as described in US 2008/0227867 A1, which with respect to the corresponding compounds disclosed therein forms part of this application by reference), deoxybenzoins such as 2-(4-hydroxyphenyl)-1-(4-hydroxy-3-methoxyphenyl)ethanone (in particular as described in DE 102009002268, which with respect to the corresponding compounds disclosed therein forms part of this application by reference) and hydroxyflavans such as 3',7-dihydroxy-4'-methoxyflavan (in particular as described in U.S. Provisional Application 61/178,667 (Symrise GmbH & Co. KG) and EP 2 253 226 A1, which with respect to the corresponding compounds disclosed therein form part of this application by reference.

Salivation-promoting flavors and/or flavoring materials are preferably trigeminally active flavors and/or flavoring materials, and are preferably selected from:
the group of heat-causing substances or hot substances, preferably selected from the list comprising: capsaicinoids, for example capsaicin, dihydrocapsaicin or nonivamide; gingerols, for example gingerol-6, gingerol-8, or gingerol-10; gingerdiones, for example gingerdione-6, gingerdione-8 or gingerdione-10; paradols, for example paradol-6, paradol-8 or paradol-10; dehydrogingerdiones, for example dehydrogingerdione-6, dehydrogingerdione-8 or dehydrogingerdione-10; piperine and piperine derivatives;
and/or
the group of substances that may be perceived as pungent, preferably selected from the group consisting of: aromatic isothiocyanates, for example phenylethylisothiocyanate, allylisothiocyanate, cyclopropylisothiocyanate, butylisothiocyanate, 3-methylthiopropylisothiocyanate, 4-hydroxybenzylisothiocyanate, 4-methoxybenzylisothiocyanate;
and/or
the group of substances producing a physiological cooling effect, preferably selected from the group consisting of menthol, preferably L-menthol, D-menthol, racemic menthol, isomenthol, neoisomenthol, neomenthol; menthyl ethers, preferably (L-menthoxy)-1,2-propanediol, (L-menthoxy)-2-methyl-1,2-propanediol, L-menthyl-methyl ether; menthyl esters, preferably menthyl formate, menthyl acetate, menthyl isobutyrate, menthyl lactate, L-menthyl-L-lactate, L-menthyl-D-lactate, L-menthyl-(2-methoxy)acetate, L-menthyl-(2-methoxyethoxy)acetate, L-menthyl pyroglutamate; menthyl carbonates, preferably L-menthyl propylene glycol carbonate, L-menthyl ethylene glycol carbonate, L-menthyl glycerol carbonate or mixtures thereof; semi-esters of menthols with a dicarboxylic acid or derivatives thereof, preferably mono-L-menthyl succinate, mono-L-menthyl glutarate, mono-L-menthyl malonate, O-L-menthyl succinic acid ester-N,N-(dimethyl)amide, O-L-menthyl succinic acid ester amide; menthane carboxylic acid amides, preferably L-menthane carboxylic acid-N-ethyl amide [WS3], N$^\alpha$-(L-menthanecarbonyl)glycine ethyl ester [WS5], L-menthane carboxylic acid-N-(4-cyanophenyl)amide, L-menthane carboxylic acid-N-(alkoxyalkyl)amides, L-menthane carboxylic acid-N-(alkylthioalkyl)amides (in particular as described in US 2008/0096969, which with respect to the corresponding compounds disclosed therein forms part of this application by reference); (L-menthanecarbonyl)amino acid alkyl amides (in particular as described in WO 2007/138031, which with respect to the corresponding compounds disclosed therein forms part of this application by reference); menthone and menthone derivatives, preferably L-menthone glycerol ketal; 2,3-dimethyl-2-(2-propyl)-butanoic acid derivatives, preferably 2,3-dimethyl-2-(2-propyl)-butanoic acid-N-methyl amide [WS23]); isopulegol and its esters (L-(−)-isopulegol, L-(−)-isopulegol acetate; menthane derivatives, preferably p-menthane-3,8-diol; cubebol and synthetic and natural mixtures containing cubebol; pyrrolidone derivatives of cycloalkyldione derivatives, preferably 3-methyl-2 (1-pyrrolidinyl)-2-cyclopenten-1-one) and tetrahydropyrimidin-2-ones, preferably icillin or related compounds (in particular as described in WO 2004/026840, which with respect to the corresponding compounds disclosed therein forms part of this application by reference), and/or the group of the alkamides perceptible as tingling in the oral cavity, preferably selected from the group consisting of 2E,4E-decadienoic acid-N-isobutyl amide (trans-pellitorin) (in particular as described in WO 2004/043906, which with respect to the corresponding compounds disclosed therein forms part of this application by reference); 2E,4Z-decadienoic acid-N-isobutyl amide (cis-pellitorin) (in particular as described in WO 2004/000787, which with respect to the corresponding compounds disclosed therein forms part of this application by reference); 2Z,4Z-decadienoic acid-N-isobutyl amide; 2Z,4E-decadienoic acid-N-isobutyl amide; 2E,4E-decadienoic acid-N-([2S]-2-methylbutyl)amide; 2E,4E-decadienoic acid-N-([2S]-2-methylbutyl)amide; 2E,4E-decadienoic acid-N-([2R]-2-methylbutyl amide); 2E,4Z-decadienoic acid-N-(2-methylbutyl)amide; 2E,4E-decadienoic acid-N-piperide (achilleamide); 2E,4E-decadienoic acid-N-piperide (sarmentine); 2E-decenoic acid-N-isobutyl amide; 3E-decenoic acid-N-isobutyl amide; 3E-nonenoic acid-N-isobutyl amide; 2E,6Z,8E-decatrienoic acid-N-isobutyl amide (spilanthol); 2E,6Z,8E-decatrienoic acid-N-([2S]-2-methylbutyl)amide (homospilanthol); 2E,6Z,8E-decatrienoic acid-N-([2R]-2-methylbutyl)amide; 2E-decen-4-inoic acid-N-isobutyl amide; 2Z-decen-4-inoic acid-N-isobutyl amide; 2E,6Z,8E,10E-dodecatetraenoic acid-N-(2-methylpropyl)amide (alpha-sanshool); 2E,6Z,8E,10E-dodecatetraenoic acid-N-(2-hydroxy-2-methylpropyl)amide (alpha-hydroxysanshool); 2E,6E,8E,10E-dodecatetraenoic acid-N-(2-hydroxy-2-methylpropyl)amide (gamma-hydroxysanshool); 2E,4E,8Z,10E,12E-tetradecapentaenoic acid-N-(2-hydroxy-2-methylpropyl)amide (gamma-hydroxysanshool); 2E,4E,8E,10E,12E-tetradecapentaenoic acid-N-(2-hydroxy-2-methylpropyl)amide (gamma-hydroxy-isosanshool); 2E,4E,8Z,10E,12E-tetradecapentaenoic acid-N-(2-methyl-2-propenyl)amide (gamma-dehydrosanshool); 2E,4E,8Z,10E,12E-tetradecapentaenoic acid-N-(2-methylpropyl)amide (gamma-sanshool); 2E,4E,8Z,11Z-tetradecatetraenoic acid-N-(2-hydroxy-2-methylpropyl)amide (bungeanool); 2E,4E,8Z,11E-tetradecatetraenoic acid-N-(2-hydroxy-2-methylpropyl)amide (isobungeanool); 2E,4E,8Z-tetradecatrienoic acid-N-(2-hydroxy-2-methylpropyl)amide (dihydrobungeanool) and 2E,4E-tetradecadienoic acid-N-(2-hydroxy-2-methylpropyl)amide (tetrahydrobungeanool).

In another preferred embodiment, the present invention relates to an orally consumable preparation, additionally containing (ii) one or more additional bitter-masking flavors and/or flavoring materials, selected from the group consisting of sodium salts, preferably sodium chloride, sodium lactate, sodium citrate, sodium acetate, sodium gluconoate, hydroxyflavanones, preferably eriodictyol, homoeriodictyol, hesperetin and sodium salts thereof, hydroxybenzoic acid amides, preferably 2,4-dihydroxybenzoic acid vanillyl amide, 2,4-dihydroxybenzoic acid-N-(4-hydroxy-3-methoxybenzyl)amide-monosodium salt, hydroxydeoxybenzoins, preferably 2-(4-hydroxy-3-methoxyphenyl)-1-(2,4,6-trihydroxyphenyl)ethanone, hydroxyphenylalkanediones, preferably gingerdione-[2] and gingerdione-[3], diacetyl trimers, gamma-aminobutyric acid, divanillins, 4-hydroxydihydrochalcones, preferably phloretin, deoxybenzoins, preferably 2-(4-hydroxyphenyl)-1-(4-hydroxy-3-methoxyphenyl)ethanone, and hydroxyflavans, preferably 3',7-dihydroxy-4'-methoxyflavan, and optionally (iv) one or more salivation-promoting flavors and/or flavoring materials, preferably selected from the group consisting of 2E,4E-decadienoic acid-N-isobutyl amide (pellitorin), 2E,4Z-decadienoic acid-N-isobutyl amide (cis-pellitorin), 2Z,4Z-decadienoic acid-N-isobutyl amide, 2Z,4E-decadienoic acid-N-isobutyl amide, 2E,6Z,8E-decatrienoic acid-N-isobutyl amide (spilanthol), 2E,6Z,8E,10E-dodecatetraenoic acid-N-(2-methylpropyl)amide (alpha-sanshool) and 2E,4E,8Z,11Z-tetradecatetraenoic acid-N-(2-hydroxy-2-methylpropyl)amide (bungeanool).

Another subject matter of the present invention is a flavoring composition for masking, reducing or suppressing a bitter, sour and/or astringent taste impression, in particular for use in an orally consumable preparation, preferably in an orally consumable foodstuff, comprising (i-a) rubusoside in an amount in the range from 0.1 to 50 wt. %, preferably in the range from 0.5 to 30 wt. %, particularly preferably in the range from 1 to 25 wt. %, (i-b) one or more phenolic compounds, preferably one or more polyphenols, from *Rubus suavissimus* in a total amount in the range from 0.1 wt. % to 25 wt. %, preferably in the range from 0.5 wt. % to 15 wt. %, more preferably in the range from 1 wt. % to 10 wt. %, particularly preferably in the range from 2 wt. % to 8 wt. %, (ii) one or more additional bitter-masking flavors and/or flavoring materials, selected from the group consisting of eriodictyol, homoeriodictyol, hesperetin and sodium salts thereof, gamma-aminobutyric acid, divanillin, phloretin, and 3',7-dihydroxy-4'-methoxyflavan, (iii) one or more malodor-suppressing aroma substances, selected from the group consisting of vanillin, ethylvanillin, 4-methoxy-2-hydroxybenzaldehyde, ethyl vanillin isobutyrate (=3-ethoxy-4-isobutyryloxybenzaldehyde), Furaneol® (2,5-dimethyl-4-hydroxy-3(2H)-furanone) and derivatives thereof, preferably homofuraneol, (=2-ethyl-4-hydroxy-5-methyl-3(2H)-furanone), homofuronol (2-ethyl-5-methyl-4-hydroxy-3(2H)-furanone and 5-ethyl-2-methyl-4-hydroxy-3(2H)-furanone), maltol and derivatives thereof, preferably ethyl maltol, coumarin and derivatives thereof, gamma-lactones (and preferably gamma-undecalactone, gamma-nonalactone), delta-lactones (and preferably 4-methyldeltalactone, massoilactone, deltadecalactone, tuberolactone, delta-dodecalactone, delta-tetradecalactone, delta-hexadecalactone, delta-octadecalactone), methyl sorbate, diacetyl, 4-hydroxy-2(or 5)-ethyl-5(or -2)-methyl-3 (2H)furanone, 2-hydroxy-3-methyl-2-cyclopentenone, 3-hydroxy-4,5-dimethyl-2(5H)-furanone, fruit esters and fruit lactones (and preferably acetic acid-n-butyl ester, acetic acid isoamyl ester, propionic acid ethyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate), 4-(p-hydroxyphenyl)-2-butanone, 1,1-dimethoxy-2,2,5-trimethyl-4-hexane, 2,6-dimethyl-5-hepten-1-al and phenylacetaldehyde, (iv) optionally one or more salivation-promoting flavors and/or flavoring materials, selected from the group consisting of 2E,4E-decadienoic acid-N-isobutyl amide (pellitorin), 2E,4Z-decadienoic acid-N-isobutyl amide (cis-pellitorin), 2Z,4Z-decadienoic acid-N-isobutyl amide, 2Z,4E-decadienoic acid-N-isobutyl amide, 2E,6Z,8E-decatrienoic acid-N-isobutyl amide (spilanthol), 2E,6Z,8E,10E-dodecatetraenoic acid-N-(2-methylpropyl)amide (alpha-sanshool) and 2E,4E,8Z,11Z-tetradecatetraenoic acid-N-(2-hydroxy-2-methylpropyl)amide (bungeanool), (v) optionally one or more auxiliary materials or carriers, selected from the group consisting of ethanol, 1,2-propylene glycol, vegetable oil triglycerides, triacetin and/or glycerol, preferably in an amount in the range from 1 to 75 wt. %, preferably in the range from 5 to 50 wt. %, particularly preferably in the range from 10 to 40 wt. %, and (vi) one, two, three, four, five, six, seven, eight, nine, ten or more volatile aroma substances, where the malodor-suppressing aroma substances of constituent (iii) of the volatile aroma substances of constituent (vi) are excepted, wherein the stated amounts refer in each case to the total weight of the flavoring composition.

"A volatile aroma substance" means within the scope of the present invention a component having a sensory effect with a vapor pressure greater than or equal to 0.01 Pa at 25° C., in particular with a vapor pressure greater than or equal to 0.025 Pa at 25° C. A high proportion of the volatile aroma substances have a vapor pressure greater than or equal to 1 Pa at 25° C., so that in particular such substances are regarded as volatile aroma substances in the sense of the present invention.

The flavoring compositions according to the invention have proved particularly effective for masking, reducing or suppressing a bitter, sour and/or astringent taste impression.

Preferably an extract from *Rubus suavissimus* is used, which comprises the stated constituents (i-a) and (i-b), preferably in one of the aforementioned embodiments.

The combination of rubusoside or a rubusoside-containing mixture is particularly effective, preferably in one of the embodiments indicated as preferred, with additional bitter-masking and/or salivation-promoting flavors and/or flavoring materials. Thus, the combination of rubusoside, preferably in the form of, i.e. as constituent of, a *Rubus suavissimus* extract, with homoeriodictyol or hesperetin and optionally with pellitorin, preferably trans-pellitorin, is particularly effective. To that extent said mixtures, flavoring compositions and oral preparations are particularly preferred within the scope of the present invention.

To that extent, said mixtures to be used according to the invention, flavoring compositions according to the invention or to be used according to the invention and orally consumable preparations according to the invention are particularly preferred that contain homoeriodictyol or hesperetin, those that contain homoeriodictyol and pellitorin or hesperetin and pellitorin and those that contain homoeriodictyol, hesperetin and pellitorin.

The decrease of the bitter, sour and/or astringent impression perceived as unpleasant can result from alteration, masking or lessening. The invention also covers a corresponding decrease or suppression of the corresponding (taste) impression when this is produced by a compound only when it is in combination with other compounds (in a mixture). Reduction, in the sense of the invention, also covers the toning down of a bitter and astringent aftertaste.

Natural sources, principally plant extracts, are also partly known and usable for the (ii) bitter-masking flavors and/or flavoring materials. In the sense of the invention, for eriodictyol and homoeriodictyol or sodium salts thereof it is possible to use e.g. extracts from *Eriodictyon* ssp, preferably *Eriodictyon californicum* or *E. angustifolium*, for eriodictyol and hesperetin—honeybush tea extracts (*Cyclopia* ssp.) or hydrolyzed extracts from the fruits or peel of *Citrus* species, and for phloretin—extracts from *Malus* ssp., principally from apple tree products, e.g. apple peel extract or enriched apple polyphenol extract, preferably apple peel extract treated enzymatically with glycosidases or with acid or with an acidic ion exchanger or enriched apple polyphenol extract.

Preferred malodor-suppressing aroma substances (iii) are vanillin, ethylvanillin, 4-methoxy-2-hydroxybenzaldehyde, ethyl vanillin isobutyrate (=3-ethoxy-4-isobutyryloxybenzaldehyde), Furaneol® (=2,5-dimethyl-4-hydroxy-3(2H)-furanone) and derivatives thereof, preferably homofuraneol (=2-ethyl-4-hydroxy-5-methyl-3(2H)-furanone), homofuronol (2-ethyl-5-methyl-4-hydroxy-3(2H)-furanone and 5-ethyl-2-methyl-4-hydroxy-3(2H)-furanone), maltol and derivatives thereof (and preferably ethyl maltol), coumarin and derivatives thereof, gamma-lactones (and preferably gamma-undecalactone, gamma-nonalactone), delta-lactones (and preferably 4-methyldeltalactone, massoilactone, delta-decalactone, tuberolactone, delta-dodecalactone, delta-tetradecalactone, delta-hexadecalactone, delta-octadecalactone), methyl sorbate, diacetyl, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, fruit esters and fruit lactones (and preferably acetic acid-n-butyl ester, acetic acid isoamyl ester, propionic acid ethyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate), 4-(p-hydroxyphenyl)-2-butanone, 1,1-dimethoxy-2,2,5-trimethyl-4-hexane, 2,6-dimethyl-5-hepten-1-al and phenylacetaldehyde.

For the (iv) salivation-promoting and trigeminally active flavors and/or flavoring materials, to some extent natural sources, principally plant extracts are known and are usable in the sense of the invention. Plant extracts, for example pepper extract containing alkamides (*Piper* ssp., in particular *P. nigrum, P. hispidum, P. tuberculatum, P. longum, P. arboreum, P. futokadsura, P. guineense, P. sarmentosum* or *Piper nigrum*, Var. *muntok, P. aff. pedicellatum*), extracts from toothache grass (*Ctenium aromaticum*), extracts from tarragon (*Artemisia dracunculus*), Bertram root extracts (*Anacyclus* ssp., in particular *Anacyclus pyrethrum* L.), echinacea extracts (*Echinaceae* ssp., e.g. *E. angustifolia*), extracts from Szechuan pepper (*Zanthoxylum* ssp., in particular *Zanthoxylum piperitum, Z. clava-herculin, Z. bungeanum, Z. zanthoxyloides*), spilanthes or paracress extracts (*Spilanthes* ssp., in particular *Spilanthes acmella*), extracts from *Acmella* ssp. (e.g. *A. ciliata*), extracts from *Achillea* ssp. (e.g. *Achillea wilsoniana*), extracts from *Fagara* species (*Fagara zanthoxyloides*), extracts from *Heliopsis* ssp. (e.g. *H. longipes*), extracts from *Cissampelos glaberrima*, extracts from *Dinosperma erythrococca*, extracts from the bark of *Esenbeckia alata* and extracts from *Stauranthus perforatus* are particularly suitable for preferred salivation-promoting and trigeminally active alkamides.

Compounds that can produce a warming, sharp, pungent, cooling and/or tingling impression in the oral cavity are trigeminally active in the sense of the present text.

The plant extracts can be obtained from the corresponding fresh or dried plants or plant parts, but in particular from white, green or black pepper grains (*P. nigrum*), long pepper (*P. longum*), echinacea roots, Bertram root, Szechuan pepper, plant parts of other *Zanthoxylum* species, plant parts of *Spilanthes* or *Acmella* species, plant parts of *Fagara* or *Heliopsis* species, plant parts of *Eriodictyon* ssp. or *Malus* ssp. Usually the dried plant parts (e.g. fresh or dried roots, fruits, seeds, bark, wood, stems, leaves or flowers [flower parts]), preferably in comminuted form, are extracted with a solvent suitable for foodstuffs and semi-luxuries at temperatures from 0° C. up to the boiling point of the respective solvent or solvent mixture, then filtered and the filtrate is concentrated completely or partially, preferably by distillation, freeze-drying or spray-drying. The raw extract thus obtained can then be processed further, for example treated enzymatically (e.g. with glycosidases to increase the yield of non-sugar-containing molecules), with acid (e.g. under pressure), with acidic ion exchangers or with steam, generally at pressures from 0.01 mbar to 100 bar, preferably at 1 mbar to 20 bar, and/or taken up in a solvent suitable for foodstuffs and semi-luxuries.

Solvents suitable for extraction in particular for foodstuffs and semi-luxuries are water, ethanol, methanol, propylene glycol, glycerol, acetone, dichloromethane, ethyl acetate, diethyl ether, hexane, heptane, triacetin, vegetable oils or fats, supercritical carbon dioxide and mixtures thereof.

Preferred auxiliary materials or carriers are maltodextrin, starch, natural or artificial polysaccharides and/or plant gums such as modified starches or gum arabic, permitted solvents for flavoring compositions e.g. ethanol, 1,2-propylene glycol, water, glycerol, triacetin, vegetable oil triglycerides, coloring matter, e.g. permitted food dyes, coloring plant extracts, stabilizers, preservatives, antioxidants, viscosity improvers.

A preferred flavoring composition according to the invention or to be used according to the invention or an orally consumable preparation according to the invention contains the components of group (i-a) at a ratio to the components of group (ii) from 1:100 to 100:1, more preferably 1:10 to 10:1, particularly preferably 1:5 to 5:1, in each case relative to the weight ratio of the two components.

If present, the components of group (iii) are preferably used according to the invention in a preferred flavoring composition according to the invention or to be used according to the invention or an orally consumable preparation according to the invention in a ratio from 1:1000000 to 1:1, more preferably 1:10000 to 1:10, particularly preferably 1:2000 to 1:50, wherein the ratio represents the weight ratio of the weight of the components of group (iii) to the total of the weights of the components of group (i-a) and (ii).

If present, the components of group (iv) are preferably used according to the invention in a preferred flavoring composition according to the invention or to be used according to the invention or an orally consumable preparation according to the invention in a ratio from 10:1 to 1:10, wherein the ratio represents the weight ratio of the weight of the components of group (iv) to the total of the weights of the components of group (i-a), (ii) and (iii).

If present, in a preferred flavoring composition according to the invention or to be used according to the invention or an orally consumable preparation according to the invention the components of group (v) are used in a ratio from 1:1000 to 1000:1, preferably 1:100 to 100:1, wherein the ratio represents the weight ratio of the components of group (v) to the total of the weights of the components of group (i-a), (ii), (iii) and (iv).

A particularly preferred flavoring composition according to the invention or to be used according to the invention further comprises at least one component for intensifying a sweet, salty, optionally slightly sour and/or umami taste impression. Therefore the flavoring compositions according to the invention or to be used according to the invention are preferably used in combination with at least one (additional) substance suitable for intensifying a pleasant taste impression (sweet, salty, umami optionally slightly sour). Preferably salty-tasting compounds/salt intensifying compounds as disclosed in WO 2007/045566, which with respect to these compounds forms part of this application by reference, hesperitin disclosed as in WO 2007/014879, which with respect to these compounds forms part of this application by reference, or propenylphenylglycosides (chavicolglycosides) as disclosed in US 2008/0220140, phyllodulcin or hydrangea extracts as described in U.S. Provisional Application 61/237,866 (Symrise GmbH & Co. KG) and EP 2 298 084 A1, which with respect to the compounds and extracts disclosed therein form part of this application by reference, Mondia extracts as described in DE 102009046126 (Symrise GmbH & Co. KG), which with respect to the compounds and extracts disclosed therein forms part of this application by reference, and umami compounds as described in WO 2008/046895 and US 2008/0292763, which with respect to these compounds form part of this application by reference.

In a preferred embodiment, a preferred flavoring composition according to the invention or to be used according to the invention additionally comprises at least one compound, which can produce bitter, sour and astringent impressions in the oral cavity, and said impressions are decreased and preferably are not perceptible owing to the content of components of groups (i-a) and (ii).

Compounds that can produce bitter, sour and/or astringent and optionally additionally sticky, dusty, dry, mealy, rancid or metallic impressions in the oral cavity, are for example: organic or inorganic acidifiers (and in particular ascorbic acid, benzoic acid, gallic acid, glucuronic acid, adipic acid, glutaric acid, malonic acid, succinic acid, malic acid, acetic acid, citric acid, tartaric acid, phosphoric acid, pyrophosphoric acid), xanthine alkaloids, xanthines (and in particular caffeine, theobromine, theophylline and methyl xanthines), alkaloids (and in particular quinine, brucine, strychnine, nicotine), phenolic glycosides (and in particular salicin, arbutin), flavonoid glycosides (e.g. neohesperidin, hesperidin, naringin, quercitrin, rutin, hyperosides, isoquercitrin, avicularin), isoflavonoids or glycosides thereof (and in particular daidzin, genistin and acyl or malonyl esters thereof), bitter-tasting chalcones or chalcone glycosides (and in particular phloridzin, phloretin-2-O'-xyloglucoside), hydrolyzable tannins (gallic or ellagic acid esters of carbohydrates, e.g. pentagalloylglucose), nonhydrolyzable tannins (optionally galloylated catechins or epicatechins and oligomers thereof, e.g. proanthocyanidins or procyanidins, thearubigenin), flavones (and in particular quercetin, taxifolin, myricetin), phenols such as salicin, polyphenols (and in particular hydroxycinnamic acids and esters thereof such as gamma oryzanol, caffeic acid or esters thereof, and in particular chlorogenic acid, neochlorogenic acid, cryptochlorogenic acid, chlorogenic acid lactones), terpenoid bitter substances (and in particular limonoids such as limonin or nomilin from *citrus* fruits, lupulones, humulones and isoalpha acids from hops, iridoids, secoiridoids), triterpene glycosides such as P57A and related active substances from

*Hoodia gordonii*, absinthin from wormwood, amarogentin from enzian, metal salts (in particular potassium, magnesium and calcium salts, potassium chloride, potassium gluconate, potassium carbonate, potassium sulfate, potassium lactate, potassium glutamate, potassium succinate, potassium malate, sodium sulfate, magnesium sulfate), pharmaceutical active substances (e.g. fluoroquinolone antibiotics, paracetamol, aspirin, beta-lactam antibiotics, ambroxol, propylthiouracil [PROP], guaifenesin), vitamins (for example vitamin H, B-series vitamins such as vitamin B1, B2, B6, B12, niacin, panthothenic acid), denatonium benzoate, sucralose octaacetate, iron salts, aluminum salts, zinc salts, urea, unsaturated fatty acids, in particular unsaturated fatty acids in emulsions, bitter-tasting amino acids (e.g. leucine, isoleucine, valine, tryptophan, proline, histidine, tyrosine, lysine or phenylalanine) and bitter-tasting peptides (in particular peptides with an amino acid from the group leucine, isoleucine, valine, tryptophan, proline or phenylalanine at the N- or C-terminus) or cyclodipeptides (mainly cyclodipeptides formed with leucine, isoleucine, valine, tryptophan, proline or phenylalanine), products from the Maillard reaction, lignans.

Preferred compounds that can produce bitter, sour and/or astringent and optionally additionally sticky, dusty, dry, mealy, rancid or metallic impressions in the oral cavity are selected according to the invention from the group consisting of ascorbic acid, benzoic acid, gallic acid, glucuronic acid, adipic acid, glutaric acid, malonic acid, succinic acid, malic acid, acetic acid, citric acid, tartaric acid, phosphoric acid, caffeine, theobromine and theophylline, quinine, salicin, arbutin, neohesperidin, naringin, quercitrin, rutin, daidzin, genistin and acyl or malonyl esters thereof, phloridzin, gallic or ellagic acid esters of carbohydrates (e.g. pentagalloylglucose), optionally galloylated catechins or epicatechins, proanthocyanidins or procyanidins, thearubigenin, quercetin, taxifolin, myricetin, gamma oryzanol, caffeic acid or esters thereof (and in particular chlorogenic acid and isomers thereof), limonoids such as limonin or nomilin from *citrus* fruits, lupulones and humulones from hops, triterpene glycosides such as P57A and related active substances from *Hoodia gordonii*, absinthin from wormwood, amarogentin from enzian, metallic salts (in particular potassium, magnesium and calcium salts, potassium chloride, potassium gluconate, potassium carbonate, potassium sulfate, potassium lactate, potassium glutamate, potassium succinate, potassium malate, sodium sulfate, magnesium sulfate) and pharmaceutical active substances (e.g. fluoroquinolone antibiotics, paracetamol, aspirin, beta-lactam antibiotics, ambroxol, propylthiouracil [PROP], guaifenesin).

Substances that have a sour and astringent taste are particularly preferred; these are preferably selected from the group consisting of ascorbic acid, benzoic acid, gallic acid, glucuronic acid, adipic acid, glutaric acid, malonic acid, succinic acid, malic acid, acetic acid, citric acid, tartaric acid, phosphoric acid, quercitrin, rutin, gallic or ellagic acid esters of carbohydrates (e.g. pentagalloylglucose), optionally galloylated catechins or epicatechins, proanthocyanidins or procyanidins, thearubigenin, gamma oryzanol, caffeic acid or esters thereof (and preferably chlorogenic acid and isomers thereof).

Compounds that can produce a bitter, sour and astringent and optionally sticky, chalky, dusty, dry, mealy, rancid or metallic aftertaste in the oral cavity, can be aroma or flavoring materials with a not unpleasant primary taste (for example sweet, salty, spicy) and/or odor and may belong e.g. to the group of sweeteners, sugar substitutes or aroma substances. The following may be mentioned as examples: potassium salts (in particular potassium chloride, potassium gluconate, potassium carbonate, potassium sulfate, potassium lactate, potassium glutamate, potassium succinate, potassium malate), aspartame, neotame, alitame, superaspartame, saccharin, sucralose, tagatose, monellin, stevioside, rebaudioside A, hernandulcin, thaumatin, miraculin, neohesperedin dihydrochalcone, naringin dihydrochalcone, glycyrrhizin, glycyrrhetic acid or derivatives thereof, cyclamate or the pharmaceutically acceptable salts of the aforementioned compounds.

As already mentioned above, it was found, surprisingly, that the mixtures according to the invention and the flavoring compositions according to the invention or to be used according to the invention can mask, reduce or even completely suppress a bitter, sour and simultaneously astringent impression in the oral cavity, which is caused in particular by the stated compounds, in a large number of orally consumable preparations (particular examples are tea beverages, particularly green tea-based beverages, soya products, particularly soya milk products, fermented milk products, particularly low-fat yogurt products, cocoa-containing products, particularly chocolate).

When using rubusoside-containing mixtures that are to be used according to the invention (as defined above), in particular when using the *Rubus suavissimus* extracts that are preferably to be used according to the invention, the simultaneous improvement in the overall flavor impression of the orally consumable preparation, as illustrated in the examples, is particularly positive. The same applies to flavoring compositions according to the invention or to be used according to the invention and to an orally consumable preparation according to the invention, in particular in one of the preferred embodiments.

The use is particularly beneficial and advantageous in the aforementioned orally consumable preparations that have an excessive sensory sour impression that is caused by the natural concentration of fruit acids, acids formed by fermentation or acids added for reasons of stability, in particular microbiological stability, and where, for technological reasons, the pH cannot or should not be altered.

An orally consumable preparation according to the invention is preferably a pharmaceutical preparation or a preparation for the purpose of nutrition, oral hygiene or pleasure, which preferably is selected from the group consisting of: fermented milk products, preferably sour milk, yogurt, kefir, sour cream, quark, cheese, fermented soya products, preferably tempeh, tofu, soya yogurt, fermented cereal products, fermented meat products, unfermented or fermented fruit and vegetable juices, other vegetable and fruit preparations and products obtained therefrom, wherein the stated products preferably must have or retain an acid content so as to remain stable, in particular microbiologically stable.

Accordingly, the mixtures to be used according to the invention and the flavoring compositions according to the invention or to be used according to the invention are suitable in particular for incorporation and as a constituent of orally consumable preparations that contain compounds that can produce a bitter, sour and astringent and optionally sticky, chalky, dusty, dry, mealy, rancid or metallic (after-) taste in the oral cavity. Reference should be made in particular to the examples of these compounds enumerated above. The mixtures to be used according to the invention and the flavoring compositions according to the invention or to be used according to the invention are thus suitable in particular for combining with (a) orally consumable preparations that have a bitter, sour and/or astringent and optionally sticky, dusty, dry, mealy, rancid and/or metallic taste and/or (b) orally consumable preparations that have a bitter, sour and simultaneously astringent, sticky, dusty, dry, mealy, rancid or metallic aftertaste.

The aforementioned unpleasant-tasting orally consumable preparations may also possess other, as a rule not unpleasant taste and/or odor characteristics. As additional taste characteristics that are not unpleasant, in the sense of the present invention, we may mention for example the impressions spicy, umami, sweet, salty and slightly sour.

Accordingly, in a further aspect the present invention relates to an orally consumable preparation containing a flavoring composition according to the invention or to be used according to the invention or a mixture to be used according to the invention.

Preferably said orally consumable preparation is a pharmaceutical preparation, intended directly for nutrition or for pleasure and/or a preparation used for oral hygiene.

Orally consumable preparations according to the invention are preferred for which
the amount of rubusoside is in the range from 1 to 200 ppm, preferably in the range from 10-150 ppm, more preferably in the range from 30 to 100 ppm, particularly preferably in the range from 50 to 100 ppm, particularly preferably in the range from 65 to 100 ppm,
and
the total amount of the components of group (ii) is in the range from 0.5 to 500 ppm, preferably from 10 to 200 ppm, particularly preferably from 20 to 100 ppm,
and
preferably at least one, more preferably the sum of the components of group (iii) is in the range from 0.005 to 5 ppm, preferably from 0.02 to 2 ppm, particularly preferably from 0.05 to 0.5 ppm,
and
the total of the components of group (iv) is in the range from 0.0005 to 500 ppm, preferably from 0.005 to 100 ppm, particularly preferably 0.5 to 50 ppm,
in each case relative to the total weight of the preparation.

Orally consumable preparations according to the invention are further preferred where the total amount of all components (i-a), (ii) and (iii) relative to the total parts of the preparation is in the range from 0.5 to 5000 ppm, preferably in the range from 5 to 1000 ppm, particularly preferably in the range from 10 to 500 ppm.

Particularly preferably, concentrations (relative to the finished preparation to be consumed orally containing a flavoring composition according to the invention or to be used according to the invention) are then for (iv) one or more of the salivation-promoting, tingling, sharp and/or hot tasting alkamides (salivation-promoting flavors and/or flavoring materials) equal to or less than 0.5 ppm, where the intrinsic taste described as tingling, sharp, numbing or hot largely disappears, but the salivation-stimulating effect is still present. This results in a particularly effective masking, decrease or suppression of the bitter, sour and/or astringent taste impressions.

As already mentioned, one aspect of the present invention relates to the use of the flavoring compositions according to the invention or to be used according to the invention for the masking, decrease or suppression of the unpleasant taste impression of an unpleasant-tasting substance, i.e. as taste correctant. Preferably the flavoring compositions according to the invention or to be used according to the invention are used in an orally consumable preparation, said preparation comprising one or more bitter, sour and/or astringent-tasting substances and optionally one or more additional unpleasant-tasting substances.

Preparations according to the invention preferably comprise 0.000001 wt. % to 1 wt. %, relative to the total weight of the preparation, of a flavoring composition according to the invention or to be used according to the invention. In addition usually one or more unpleasant-tasting substances are present, each of them being in each case present individually at a concentration that is regularly above the recognition taste threshold of the respective substance.

The orally consumable preparations that are serving for nutrition or for pleasure, are e.g. baked products (e.g. bread, cookies, cakes, other bakery products), confectionery (e.g. chocolate, chocolate bar products, other bar products, fruit gums, hard and soft toffee, chewing gum), alcoholic or nonalcoholic beverages (e.g. coffee, tea, wine, wine-containing beverages, beer, beer-containing beverages, liqueurs, spirits, brandies, fruit-containing lemonades, isotonic beverages, refreshing drinks, nectars, fruit and vegetable juices, fruit or vegetable juice preparations), instant beverages (e.g. instant cocoa beverages, instant tea beverages, instant coffee beverages, instant fruit beverages), meat products (e.g. ham, fresh sausage or raw sausage preparations, spiced or marinated fresh or salt meat products), eggs or egg products (dried egg, egg white, yolk), cereal products (e.g. breakfast cereals, muesli bars, precooked finished rice products), milk products (e.g. milk drinks, buttermilk drinks, milk ices, yogurt, kefir, fresh cheese, soft cheese, hard cheese, dry milk powder, whey, butter, buttermilk, partially or fully hydrolyzed milk protein-containing products), products from soya protein or other soybean fractions (e.g. soya milk and products prepared therefrom, fruit drinks with soya protein, soya lecithin-containing preparations, fermented products such as tofu or tempeh or products prepared therefrom), fruit preparations (e.g. jams, fruit ices, fruit sauces, fruit fillings), vegetable preparations (e.g. ketchup, sauces, dried vegetables, deep-frozen vegetables, precooked vegetables, preserved vegetables), nibbles (e.g. baked or fried potato chips or potato dough products, extruded products based on maize or peanut), products based on fat and oil or emulsions thereof (e.g. mayonnaise, remoulades, dressings), other ready meals and soups (e.g. dry soups, instant soups, precooked soups), spices, spice mixtures and in particular seasonings, which find application for example in the snack area. The preparations in the sense of the invention can also be used for the production of other preparations serving for nutrition or pleasure. The preparations in the sense of the invention can also be in the form of capsules, tablets (non-coated and coated tablets, e.g. coatings resistant to gastric juices), sugar-coated tablets, granules, pellets, solid mixtures, dispersions in liquid phases, as emulsions, as powders, as solutions, as pastes or as other preparations as food supplements that are to be swallowed or chewed.

The orally consumable preparations that are used for purposes of oral hygiene are in particular mouth and/or dental care products such as toothpastes, tooth gels, tooth powders, mouthwash, chewing gums and other oral care products.

The orally consumable preparations that serve for pharmaceutical application comprise at least one pharmaceutical active substance.

Advantageous pharmaceutical active substances are for example nonsteroidal pharmaceutical and steroidal anti-inflammatory substances.

Preferred steroidal anti-inflammatory substances are of the corticosteroid type, e.g. hydrocortisone, hydrocortisone derivatives such as hydrocortisone-17-butyrate, dexamethasone, dexamethasone phosphate, methylprednisolone or cortisone.

Advantageous nonsteroidal pharmaceutical active substances are for example anti-inflammatory drugs such as oxicams as piroxicam or tenoxicam; salicylates such as Aspirin® (acetylsalicylic acid), Disalcid, Solprin or fendosal; acetic acid derivatives such as diclofenac, fenclofenac, indomethacin, sulindac, tolmetin, or clindanac; fenamates such as mefenamic, meclofenamic, flufenamic or niflumic; propionic acid derivatives such as ibuprofen, naproxen, flurbiprofen, benoxaprofen or pyrazoles such as phenylbutazone, oxyphenylbutazone, febrazone or azapropazone.

Particularly preferred pharmaceutical preparations are non-prescription products and so-called OTC (over-the-counter) medicines, containing active substances such as paracetamol, acetylsalicylic acid or ibuprofen, vitamins (for example vitamin H, B-series vitamins such as vitamin B1, B2, B6, B12, niacin, panthothenic acid, preferably in the form of (effervescent) tablets or capsules), minerals (preferably in the form of (effervescent) tablets or capsules) such as iron salts, zinc salts, selenium salts, products containing active substances or extracts of ribwort (e.g. in cough syrup) or St. John's wort.

Other usual active substances, basic substances, excipients and additives for the orally consumable preparations can be present in amounts from 5 to 99.99 wt. %, preferably 10 to 80 wt. %, relative to the total weight of the preparation. Furthermore, the preparations can contain water in an amount up to 99.99 wt. %, preferably 5 to 80 wt. %, relative to the total weight of the preparation.

The orally consumable preparations containing the mixture or flavoring composition according to the invention or to be used according to the invention are produced, according to a preferred embodiment, by incorporating the constituents of groups (i-a), (ii) and optionally also (iii) of the flavoring composition according to the invention or to be used according to the invention as substances, as solution or in the form of a mixture with a solid or liquid vehicle in a preparation serving for nutrition, oral hygiene or pleasure or as the basis for an oral pharmaceutical. Advantageously, orally consumable preparations that are in the form of solution can also be converted to a solid preparation by spray drying.

According to another preferred embodiment, for the production of an orally consumable preparation according to the invention, a flavoring composition according to the invention or to be used according to the invention or a mixture to be used according to the invention and optionally other additional constituents of the preparation according to the invention are incorporated in the form of emulsions, in liposomes, e.g. starting from phosphatidyl choline, in microspheres, in nanospheres or also in capsules, granules or extruded products made from a matrix suitable for foodstuffs and semi-luxuries, e.g. from starch, starch derivatives, cellulose or cellulose derivatives (e.g. hydroxypropylcellulose), other polysaccharides (e.g. alginate), natural fats, natural waxes (e.g. beeswax, carnauba wax) or from proteins, e.g. gelatin.

In another preferred method of production, a flavoring composition according to the invention or to be used according to the invention or a mixture to be used according to the invention is complexed beforehand with one or more suitable complexing agents, for example with cycloglycans, e.g. cyclofructans, cyclodextrins or cyclodextrin derivatives, preferably alpha-, beta-, and/or gamma-cyclodextrin, and used in this complexed form.

An orally consumable preparation according to the invention, for which the matrix is selected so that the flavoring composition according to the invention or to be used according to the invention or a mixture to be used according to the invention is released from the matrix with a delay, so that a long-lasting action is obtained, is particularly preferred.

Usual raw materials, excipients and additives for foodstuffs or semi-luxuries can be used as further constituents for orally consumable preparations according to the invention. Some of these substances have an unpleasant taste in the sense of having a bitter and astringent effect.

Examples of usual raw materials, excipients and additives for orally consumable preparations according to the invention are water, mixtures of fresh or processed, plant or animal basic or raw materials (e.g. raw, baked, dried, fermented, smoked and/or boiled meat, bone, cartilage, fish, vegetables, fruits, herbs, nuts, vegetable or fruit juices or pastes or mixtures thereof), digestible or indigestible carbohydrates (e.g. sucrose, maltose, fructose, glucose, dextrins, amylose, amylopectin, inulin, xylans, cellulose), sugar alcohols (e.g. sorbitol), natural or hardened fats (e.g. tallow, lard, palm fat, coconut fat, hardened vegetable fat), oils (e.g. sunflower oil, peanut oil, corn oil, olive oil, fish oil, soya oil, sesame oil), fatty acids or salts thereof (e.g. potassium stearate), proteinogenic or non-proteinogenic amino acids and related compounds (e.g. taurine), peptides, native or processed proteins (e.g. gelatin), enzymes (e.g. peptidases), nucleic acids, nucleotides, taste correctants for further, as a rule not unpleasant taste impressions, taste modulating substances (e.g. inositol phosphate, nucleotides such as guanosine monophosphate, adenosine monophosphate or other substances such as sodium glutamate or 2-phenoxypropionic acid), emulsifiers (e.g. lecithins, diacylglycerols), stabilizers (e.g. carrageenan, alginate), preservatives (e.g. benzoic acid, sorbic acid), antioxidants (e.g. tocopherol, ascorbic acid), chelating agents (e.g. citric acid), sweeteners (e.g. saccharin, cyclamate, aspartame, neotame), mineral salts (e.g. sodium chloride, potassium chloride, magnesium chloride, sodium phosphates), substances preventing enzymatic browning (e.g. sulfite, ascorbic acid), essential oils, plant extracts, natural or synthetic dyes or coloring pigments (e.g. carotenoids, flavonoids, anthocyans, chlorophyll and derivatives thereof), spices, synthetic, natural or artificial aroma substances or odoriferous substances and odor correctants.

Dental hygiene products (preparations serving as a basis for oral hygiene), which contain a flavoring composition according to the invention or to be used according to the invention, preferably comprise an abrasive system (abrasive or polishing material), e.g. silicas, calcium carbonates, calcium phosphates, aluminum oxides and/or hydroxyapatites, surfactants e.g. sodium laurylsulfate, sodium laurylsarcosinate and/or cocamidopropylbetaine, humectants e.g. glycerol and/or sorbitol, thickeners, e.g. carboxymethylcellulose, polyethylene glycols, carrageenan and/or Laponite®, sweeteners, e.g. saccharin, taste correctants for further, as a rule not unpleasant taste impressions, taste modulating substances (e.g. inositol phosphate, nucleotides such as guanosine monophosphate, adenosine monophosphate or other substances such as sodium glutamate or 2-phenoxypropionic acid), substances having a cooling effect e.g. menthol, menthol derivatives (e.g. L-menthol, L-menthyl lactate, L-menthyl alkyl carbonates, menthone ketals, menthane carboxylic acid amides), 2,2,2-trialkylacetic acid amides (e.g. 2,2-diisopropylpropionic acid methyl amide), icillin derivatives, stabilizers and activating substances, e.g. sodium fluoride, sodium monofluorophosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, aromas, sodium bicarbonate and/or odor correctants.

Chewing gums (as a further example for preparations serving for oral hygiene), which contain a flavoring composition according to the invention or to be used according to the invention or a mixture to be used according to the invention, preferably comprise a chewing gum base, i.e. a chewable mass that becomes plastic on chewing, sugars of various kinds, sugar substitutes, sweeteners, sugar alcohols, taste correctants for further, as a rule not unpleasant taste impressions, taste modulating substances (e.g. inositol phosphate, nucleotides such as guanosine monophosphate, adenosine monophosphate or other substances such as sodium glutamate or 2-phenoxypropionic acid), the substances having a cooling effect mentioned in the preceding section, humectants, thickeners, emulsifiers, aromas, stabilizers and/or odor correctants.

Preferred orally consumable preparations according to the invention are preparations serving for nutrition, oral hygiene or pleasure, with respect to whose compositions the foregoing applies.

The orally consumable preparations according to the invention are regularly products that are intended to be placed in the human oral cavity, to remain there for a certain time and then either to be consumed (e.g. edible foodstuffs) or removed from the oral cavity again (e.g. chewing gums or toothpaste). It is to be understood that the use of the flavoring compositions according to the invention or to be used according to the invention is envisaged for each type of such products. These products include all substances or products that are intended, in the processed, partially processed or unprocessed state, to be placed by a human being in the oral cavity. This also includes substances that are added to foods during their production, processing or treatment and are intended to be placed in the human oral cavity.

It is to be understood that the flavoring compositions according to the invention or to be used according to the invention can in particular be used in foodstuffs. Within the scope of the present text, "foodstuffs" are to be understood in particular as substances that are intended to be swallowed in the unaltered, prepared or processed state by a human being and then digested; foodstuffs are also to be understood as coverings, coatings or other enclosures that are intended to be swallowed at the same time, or for which swallowing is to be anticipated. Certain products that are usually removed again from the oral cavity (e.g. chewing gums) are also to be understood as foodstuffs within the scope of the present text, as at least partial swallowing thereof cannot be ruled out.

In particular, the flavoring compositions according to the invention or to be used according to the invention are used in foodstuffs ready for consumption. A "foodstuff ready for consumption" is to be understood as a foodstuff that is already completely composed with respect to the substances that are decisive for the taste. The term "foodstuff ready for consumption" also includes corresponding beverages and solid or semi-solid foodstuffs ready for consumption. As examples, we may mention deep-frozen products, which prior to consumption must be thawed and heated to the consumption temperature. Products such as yogurt or ice creams as well as chewing gums or hard toffees are also included among the foodstuffs ready for consumption.

A "preparation used for oral hygiene" (oral hygiene product, also called oral hygiene preparation) means, in the sense of the invention, a preparation for cleaning and care of the oral cavity and of the pharyngeal cavity and for freshening the breath. This expressly includes the care of the teeth and of the gums. Dosage forms of usual oral hygiene formulations are creams, gels, pastes, foams, emulsions, suspensions, aerosols, sprays as well as capsules, granules, pastilles, tablets, bonbons or chewing gums, without this list being regarded as exhaustive for the purposes of this invention.

The flavoring compositions according to the invention or to be used according to the invention can also be used in semi-prepared food products. The term semi-prepared food products relates to foodstuffs that are only intended to be consumed after further processing, e.g. after adding aroma or flavoring materials that are (also) decisive for the sensory impression.

Accordingly, the use of a flavoring composition according to the invention or to be used according to the invention (preferably without a compound that can produce bitter, sour and/or astringent impressions in the oral cavity) for decreasing or suppressing a bitter, sour and/or astringent effect of a compound is also part of the invention.

In the use according to the invention, it may be advantageous if not all bitter-tasting nuances (the same may also apply to the sour and astringent effect) are masked, as these may in certain circumstances even be desirable.

The above information concerning preferred and particularly preferred embodiments of the applications and orally consumable preparations according to the invention also apply correspondingly to the methods according to the invention described hereunder.

A method for masking, reducing or suppressing the bitter, sour and/or astringent effect of a compound, comprising the steps a) providing one or more compounds that can produce a bitter, sour and/or astringent effect in the oral cavity, b) providing an effective amount of rubusoside, preferably in the form of a mixture to be used according to the invention or a flavoring composition according to the invention or to be used according to the invention, preferably in one of the aforementioned preferred embodiments,
and c) mixing the components provided in step a) and b) in a ratio to one another such that the compound with a bitter, sour and/or astringent effect only produces this effect in attenuated form or not at all, when the mixture is placed in the oral cavity, is also part of the invention.

Finally, the invention also relates to a method of production of an orally consumable preparation according to the invention, characterized by the following steps:

providing an orally consumable starting mixture, which contains one or more bitter, sour and/or astringent-tasting substances in an amount such that said starting mixture tastes perceptibly bitter, sour and/or astringent, providing rubusoside, preferably in the form of a mixture to be used according to the invention or a flavoring composition according to the invention or to be used according to the invention, preferably in one of the aforementioned preferred embodiments, or the individual constituents of said mixture, mixing the rubusoside and the orally consumable starting mixture, so that the amount of rubusoside is sufficient to mask, reduce or suppress the bitter, sour and/or astringent taste impression of the bitter, sour and/or astringent-tasting substance or substances, in comparison with the starting mixture.

Further explanation of the invention is provided below on the basis of examples and the claims. The examples are given for the purpose of clarifying the invention, without limiting the scope of protection of the patent claims.

EXAMPLES

Unless stated otherwise, all data refer to weight.

Example 1: Analytical Composition of a *Rubus suavissimus* Extract with 22.6 wt. % Rubusoside, Dissolved in Glycerol, to be Used According to the Invention

| CAS-No. | Name | Wt. % |
|---|---|---|
| 64849-39-4 | Rubusoside | 22.6% |
| 476-66-4 | Ellagic acid | 0.22% |
|  | Glucose | 0.1% |
|  | Water | 29.8% |
|  | Glycerol | 30.5% |
|  | Proteins, total | 1.3% |
|  | Free sugars, total | 4.6% |
|  | Total content of phenols (according to Folin-Ciocalteu; including ellagic acid and other polyphenols) | 5.7% |
|  | Unknown substances | To 100% |

Example of Application 1: Suppression of Bitter Taste with Rubusoside or a *Rubus suavissimus* Extract To quantify the reduction of the bitter impression, the bitterness of the bitter substance in solution in water and of a sample that contained bitter substance and the amount of the test compound or of the extract (test substance) stated in each case was determined by a group of experts (classification 0 [not bitter] to 10 [extremely bitter]). Evaluation was carried out as calculation of the reduction (in %) of the bitter impression from the average values of the assessments of the bitter substance solution or the bitter substance and examples of solutions containing the test substance.

| Test substance | Bitter substance | Bitter impression (1-10) a) without test substance | Bitter impression (1-10) b) with test substance | % Reduction of the bitter impression |
|---|---|---|---|---|
| 60 ppm *Rubus suavissimus* extract from Example 1 | 500 ppm caffeine | 5.2 | 4.1 | 21% |
| 60 ppm *Rubus suavissimus* extract from Example 1 | 0.5% potassium chloride | 4.8 | 4.4 | 9% |

Example of Application 2: Flavoring Compositions

| Ingredient | A | B | C | D | E | F | G | H |
|---|---|---|---|---|---|---|---|---|
| *Rubus suavissimus* extract, from Example 1 |  | 5 |  | 40 | 17.5 | 32.5 | 40 |  |
| *Rubus suavissimus* extract, dry containing 10% rubusoside | 10 |  | 65 |  |  |  |  | 35 |
| Homoeriodictyol | 5 |  | 2.5 |  |  |  |  |  |
| Eriodictyol |  | 2.5 |  |  |  |  |  |  |
| Phloretin |  |  |  | 1 |  |  |  |  |
| Hesperetin |  |  |  |  | 0.5 |  |  |  |
| 10 wt. % trans-pellitorin (e.g. according to WO 2004/043906) in 1,2-propylene glycol/diethylmalonate |  |  |  | 0.25 | 0.25 | 0.5 | 0.25 |  |
| Extract from *Hydrangea macrophylla* according to U.S. Provisional Application 61/237,866 (Symrise) and EP 2 298 084 A1, containing phyllodulcin | 2.5 |  | 2.5 |  |  |  |  | 2.5 |
| Jambul oleoresin, containing 30 wt. % spilanthol in 1,2-propylene glycol (Robertet) |  | 0.1 | 0.1 |  |  |  |  |  |
| 1,2-Propylene glycol | — | 20 | — | to 100 | to 100 | 20 | to 100 | — |
| Glycerol | — | to 100 | — | 20 | 20 | to 100 | 20 | — |
| Maltodextrin | to 100 | — | to 100 | — | — | — | — | to 100 |

The substances or solutions are mixed in the proportions stated above and are then taken up in 1,2-propylene glycol and/or glycerol and are dissolved completely by gentle heating or mixed homogeneously with the solid vehicles.

Example of Application 3: Spray-Dried Flavoring Compositions

| Ingredient | Flavoring composition (amount used in wt. %) | | | | | | | |
|---|---|---|---|---|---|---|---|---|
| | A | B | C | D | E | F | G | H |
| Maltodextrin from wheat | 24.3 | 24.3 | 24.3 | 24.3 | 24.3 | 24.3 | 24.3 | 24.3 |
| Gum arabic | 6.1 | 6.1 | 6.1 | 6.1 | 6.1 | 6.1 | 6.1 | 6.1 |
| *Rubus suavissimus* extract, liquid, containing 20% rubusoside | 10 | 10 | 8 | 10 | 8 | 10 | 12 | 12 |
| Trans-pellitorin according to WO 2004/043906 | 0.02 | 0.02 | 0.01 | 0.02 | 0.01 | 0.01 | 0.02 | 0.03 |
| Homoeriodictyol, sodium salt | 1 | 1 | | 1.2 | | | 2 | |
| Hesperetin | | 0.2 | | | | | | |
| Phloretin | | | 0.4 | | | | | |
| Drinking water | to 100 | to 100 | to 100 | to 100 | to 100 | to 100 | to 100 | to 100 |

The drinking water is placed in a container and the maltodextrin and the gum arabic are dissolved in it. Then the constituents are emulsified using a mixer (Ultra Turrax) in the solution of vehicle described above. The temperature of the resultant mixture should not exceed 30° C. The mixture is then spray-dried (required inlet temperature: 185-195° C., required outlet temperature: 70-75° C.). The spray-dried semi-finished product contains approx. 18-22% of the flavoring compositions.

Spray-dried preparations can also be produced similarly with other flavoring compositions according to the invention or to be used according to the invention.

Example of Application 4: Use of the Flavoring Compositions in Orally Consumable Preparations

| | Preparation (amount used in wt. %) | | | | | |
|---|---|---|---|---|---|---|
| | A | B | C | D | E | F |
| Yogurt 0.1% fat | 99.9 | | | | | |
| Yogurt 1.5% fat | | 99.9 | | | | |
| Orange juice | | | | | 99.9 | 99.9 |
| Green-tea beverage | | | 99.8 | 99.85 | | |
| Flavoring composition 2E | 0.1 | | | | 0.1 | |
| Flavoring composition 2F | | 0.1 | | | | 0.1 |
| Flavoring composition 3B | | | 0.2 | | | |
| Flavoring composition 3G | | | | 0.15 | | |

The flavored samples A, B, E and F show a reduced sour impression relative to the unflavored base. The flavored samples C and D have, relative to the unflavored samples, a greatly reduced perception of bitterness and in the case of the yogurts and of the orange juice, of sourness and astringency, without an increase in sweetness.

Example of Application 5: Flavoring Compositions for Masking a Bitter and Astringent Taste

| Ingredient | Flavoring composition (amount used in wt. %) | | | | | | | | | | | |
|---|---|---|---|---|---|---|---|---|---|---|---|---|
| | A | B | C | D | E | F | G | H | I | J | K | L |
| Symrise cream flavor in 1,2-propylene glycol | | | 0.8 | 1 | 1 | | | | | | | |
| Symrise spring herbs flavor, spray-dried | | | | | | | 5 | 2.5 | | | | |
| Symrise soya-masking flavor in 1,2-propylene glycol | | | | | 10 | | | | | | | |
| Symrise soya-masking flavor, spray-dried | | | | | | 10 | | | | | | |
| Symrise juice intensifying flavor | 10 | | | | | | | | | | | 5 |
| Symrise orange flavor | | 2.5 | | | | | | | | | | |
| *Rubus suavissimus* extract, dry, containing 10% rubusoside | | | | | | | 35 | 40 | 80 | | | |
| *Rubus suavissimus* extract, liquid, containing rubusoside from Example 1 | 40 | 17.5 | 5 | 17.5 | 32.5 | | | | | | | 40 |
| Homoeriodictyol, sodium salt | | | | | | 2.5 | | | | | | |

-continued

| Ingredient | Flavoring composition (amount used in wt. %) | | | | | | | | | | | |
|---|---|---|---|---|---|---|---|---|---|---|---|---|
| | A | B | C | D | E | F | G | H | I | J | K | L |
| Hesperetin | 0.5 | | | 0.5 | 0.5 | | | | | | | |
| 10 wt. % pellitorin (e.g. according to WO 2004/043906) in 1,2-propylene glycol/diethylmalonate | 0.25 | | 0.25 | 0.5 | | | | | | | | |
| Glycerol | to 100 | to 100 | to 100 | to 100 | to 100 | | | | to 100 | | | |
| 1,2-Propylene glycol | 20 | 30 | 30 | 20 | 20 | | | | 30 | | | |
| Maltodextrin | | | — | | | to 100 | to 100 | to 100 | | | | to 100 |

The substances or solutions are mixed in the proportions stated above and then taken up in propylene glycol and/or glycerol and are dissolved completely with gentle heating or mixed homogeneously with the solid vehicles.

Example of Application 6: Reduction of Astringent and Sour Impression

The following products, in each case without and with a flavoring composition, were assessed by a panel of trained tasters. The astringent impression and sour impression were assessed on a scale from 1 (not perceptible) to 9 (very strong) and averaged for the tasters.

Example of Application 7: Reduction of the Bitter and Sour Impression

The following products, in each case without and with a flavoring composition, were assessed by a panel of trained tasters. The bitter impression (only in the case of orange juice) and the sour impression were assessed on a scale from 1 (not perceptible) to 9 (very strong) and averaged over the tasters.

| Orally consumable preparation | Test substance | Astringent impression (0-9) | | Sour impression (0-9) | |
|---|---|---|---|---|---|
| | | a) without test substance | b) with test substance | a) without test substance | b) with test substance |
| Yogurt 0.1% fat | 0.1% of flavoring composition from Example of application 5C | 4.5 | 3 | 6 | 4 |
| Yogurt 0.1% fat | 0.1% of flavoring composition from Example of application 5D | 4.5 | 2 | 6 | 3 |
| Yogurt 0.1% fat | 10 mg/kg rubusoside | 5 | 5 | 7 | 5.5 |
| Soya yogurt 2.7% fat | 0.1% of flavoring composition from Example of application 5F | 7 | 5 | 4 | 2 |
| Soya yogurt 2.7% fat | 0.1% of flavoring composition from Example of application 5E | 7 | 4.5 | 4 | 2 |
| Yogurt 0.1% fat | 10 mg/kg rubusoside | 5 | 5 | 7 | 5.5 |

| Orally consumable preparation | Test substance | Bitter impression (0-9) | | Sour impression (0-9) | |
|---|---|---|---|---|---|
| | | a) without test substance | b) with test substance | a) without test substance | b) with test substance |
| Orange direct juice | 0.1% of flavoring composition from Example of application 5A | 4.5 | 3 | 6 | 4 |
| Pineapple direct juice | 0.1% of flavoring composition from Example of application 5I | n.a. | n.a. | 4 | 3 |
| Salad dressing (water-oil based) | 0.2% of flavoring composition from Example of application 5G | n.a. | n.a. | 7 | 5.5 | n.a. = not assessed

The invention claimed is:

1. A method for masking the sour and/or astringent taste of chlorogenic acid or isomers thereof, wherein the method is consisting of:
adding to said chlorogenic acid or isomers thereof, an amount of rubusoside that does not bring about a sweet taste impression that is greater than a sweet taste impression of a 1.5 wt. % aqueous sucrose solution, thereby masking sour and/or astringent taste of the chlorogenic acid or isomers thereof.

2. A method for masking the sour and/or astringent taste of chlorogenic acid or isomers thereof, wherein the method is consisting of:
adding to said chlorogenic acid or isomers thereof an extract of *Rubus suavissimus* in an amount that does not bring about a sweet taste impression that is greater than a sweet taste impression of a 1.5 wt. % aqueous sucrose solution, thereby masking sour and/or astringent taste of the chlorogenic acid or isomers thereof.

3. The method of claim 2, wherein said extract of *Rubus suavissimus* contains rubusosides and polyphenols.

4. The method of claim 3, wherein said extract contains polyphenols selected from the group consisting of ellagic acid, gallic acid and flavonoids and mixtures thereof.

5. The method of claim 4, wherein said flavonoids are selected from the group consisting of rutin and isoquercitrin and mixtures thereof.

6. The method of claim 2, wherein said extract of *Rubus suavissimus* comprises
(a) rubusosides in an amount from 0.1 to 50 wt. % and
(b) one or more phenolic compounds in a total amount in the range from 0.1 to 25 wt. %.

7. The method of claim 2, wherein said extract of *Rubus suavissimus* is obtained by a method comprising:
(a) obtaining a primary extract from leaves using an extractant at a temperature in a range from 0° C. up to the boiling point of the extractant at normal pressure,
(b) optionally concentrating the primary extract,
(c) obtaining a secondary extract by treating the primary extract,
(d) drying of the secondary extract, and
(e) optionally mixing the dried secondary extract with a diluent or a mixture of two or more diluents.

* * * * *